United States Patent
Hagiwara et al.

(10) Patent No.: US 6,782,622 B2
(45) Date of Patent: Aug. 31, 2004

(54) METHOD FOR MANUFACTURING WHEEL-SUPPORTING HUB UNIT AND PRESSING MOLD FOR MANUFACTURING SAME HUB UNIT

(75) Inventors: Nobuyuki Hagiwara, Kanagawa (JP); Shoji Horike, Kanagawa (JP)

(73) Assignee: NSK Ltd., Tokyo (JP)

( * ) Notice: Subject to any disclaimer, the term of this patent is extended or adjusted under 35 U.S.C. 154(b) by 316 days.

(21) Appl. No.: 09/991,901

(22) Filed: Nov. 26, 2001

(65) Prior Publication Data

US 2002/0062564 A1 May 30, 2002

(30) Foreign Application Priority Data

Nov. 29, 2000 (JP) .................................... P. 2000-362803
Sep. 5, 2001 (JP) .................................... P. 2001-268323

(51) Int. Cl.[7] ............................ B21K 1/40; B21D 41/02
(52) U.S. Cl. ................. 29/894.362; 29/725; 29/894.36; 29/898.07; 72/67; 72/115; 72/370.03; 72/370.1; 72/370.11
(58) Field of Search ..................... 29/894.361, 894.362, 29/894.36, 898.07, 724, 725; 72/370.03, 370.1, 370.11, 67, 84, 115

(56) References Cited

U.S. PATENT DOCUMENTS

| | | | | |
|---|---|---|---|---|
| 5,490,732 A | * | 2/1996 | Hofmann et al. | 384/537 |
| 5,822,859 A | * | 10/1998 | Kessen et al. | 29/898.061 |
| 5,822,860 A | * | 10/1998 | Wadsworth-Dubbert et al. | 29/898.061 |
| 5,911,458 A | * | 6/1999 | Bywalez et al. | 29/898.062 |
| 6,089,673 A | * | 7/2000 | Wiacek et al. | 301/105.1 |
| 6,105,251 A | * | 8/2000 | Payen | 29/898.066 |
| 6,113,279 A | * | 9/2000 | Sawai et al. | 384/537 |
| 6,280,096 B1 | * | 8/2001 | Miyazaki et al. | 384/544 |
| 6,336,747 B1 | * | 1/2002 | Sawai et al. | 384/537 |
| 6,398,419 B1 | * | 6/2002 | Kashiwagi et al. | 384/537 |
| 6,422,758 B1 | * | 7/2002 | Miyazaki et al. | 384/544 |
| 6,524,011 B2 | * | 2/2003 | Miyazaki et al. | 384/544 |
| 6,532,666 B1 | * | 3/2003 | Denny et al. | 29/898.06 |
| 6,553,666 B2 | * | 4/2003 | Miyazaki | 29/894.362 |
| 6,574,865 B2 | * | 6/2003 | Meeker et al. | 29/894.361 |
| 6,581,287 B2 | * | 6/2003 | Sawai et al. | 29/898.062 |
| 6,622,377 B1 | * | 9/2003 | Johnson et al. | 29/724 |
| 6,640,438 B2 | * | 11/2003 | Webb et al. | 29/894.362 |
| 2003/0016894 A1 | * | 1/2003 | Miyazaki | 384/544 |
| 2003/0061713 A1 | * | 4/2003 | Hagiwara et al. | 29/894.362 |
| 2003/0074793 A1 | * | 4/2003 | Toda et al. | 29/898.07 |

FOREIGN PATENT DOCUMENTS

| | | | |
|---|---|---|---|
| EP | 0 849 097 A2 | 6/1998 | |
| JP | 11-5404 | 1/1999 | ........... B60B/35/16 |
| JP | 2000-38005 | 2/2000 | ........... B60B/35/18 |
| JP | 2000-87979 | 3/2000 | ........... F16C/33/60 |

* cited by examiner

Primary Examiner—Essama Omgba
(74) Attorney, Agent, or Firm—Sughrue Mion, PLLC

(57) ABSTRACT

A cylindrical portion formed in the inside end portion of the hub is caulked and spread using a pressing mold assembled to an oscillating/caulking apparatus to thereby form the caulking portion. In working or forming the caulking portion, a cylindrical projecting portion formed in the central portion of the leading end face of the pressing mold is inserted into the cylindrical portion to thereby prevent the inside diameter of the cylindrical portion from reducing excessively.

6 Claims, 9 Drawing Sheets

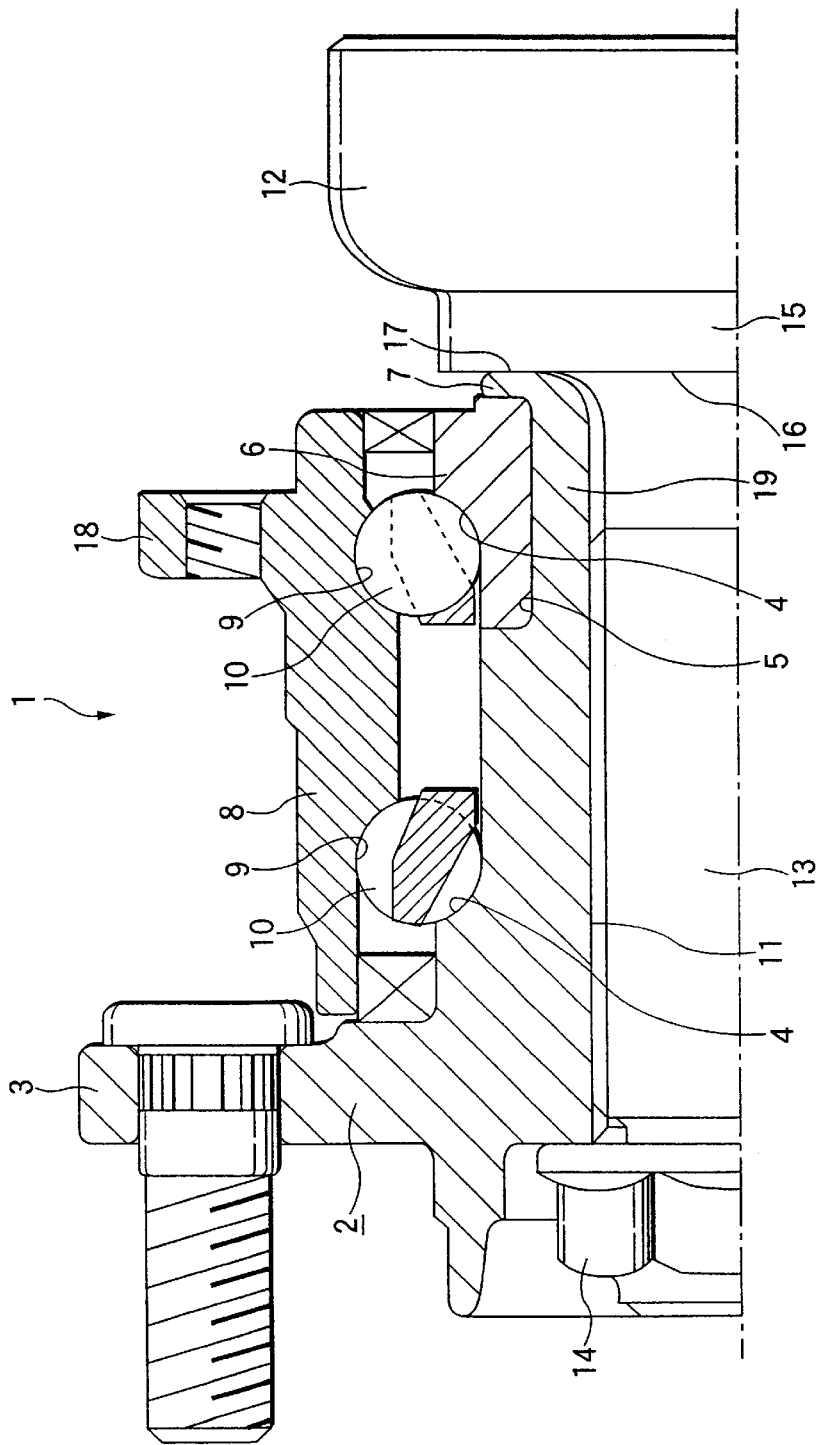

METHOD FOR MANUFACTURING WHEEL-SUPPORTING HUB UNIT AND PRESSING MOLD FOR MANUFACTURING SAME HUB UNIT

BACKGROUND OF THE INVENTION

The present invention relates to a method for manufacturing a wheel-supporting hub unit for supporting wheels of a vehicle on a suspension of the vehicle in a freely rotatable manner and a pressing mold for manufacturing same hub unit.

The wheels of the vehicle are supported on the suspension by the wheel-supporting hub unit. FIGS. 9A and 10 show an example of the wheel-supporting hub unit for supporting the wheels of the car (rear wheels of a FR car, front wheels of a FF car, all wheels of a 4WD car) on the suspension of the car, which is disclosed in Japanese Patent Unexamined Publication No.Hei 11-5404. In an outside end portion of an outer peripheral surface of a hub 2 forming the present wheel-supporting hub unit, there is disposed a flange 3. Here, a term "outer" side means a side of the hub 2 that is near to outside the car in the width direction of the car in a state where the hub 2 is assembled to the car. In FIGS. 9A and 10, the term "outer" side means the left side. On the other hand, the side of the hub 2 that is near to the center of the car in the width direction of the car is referred to as a "inner" side. In FIGS. 9A and 10, the "inner" side means the right side. In the middle portion of the outer peripheral surface of the hub 2, there is formed an inner raceway 4 which corresponds to a first inner raceway. In the inside end portion of the outer peripheral surface of the hub 2, there is formed a small-diameter stepped portion 5. An inner ring 6 includes another inner raceway 4 corresponding to a second inner raceway in its outer peripheral surface.

In FIG. 9B, as the same as above structure of the wheel supporting hub unit, in the inside end portion of the outer peripheral surface of the hub 2, there is formed a small-diameter stepped portion 5. An inner ring 6 includes inner raceway 4 corresponding to a first inner raceway and a second inner raceway in its outer peripheral surface. In FIGS. 9A, 9B and 10, the inner ring 6 is fitted with the outer surface of the small-diameter stepped portion 5, and the inside end face of the inner ring 6 is held by a caulking portion 7 formed in the inside end portion of the hub 2. The inner ring 6 is held by and between the caulking portion 7 and a stepped surface of the small-diameter stepped portion 5, thereby the inner ring 6 is fixed to the hub 2.

On the periphery of the hub 2, there is disposed an outer ring 8 in such a manner that it is concentric with the hub 2. In the inner peripheral surface of the outer ring 8, there are formed a pair of outer raceways 9, 9 corresponding to the first and second inner raceways.

Between the outer raceways 9, 9 and the inner raceways 4, 4, there are disposed rolling elements 10, 10 respectively two or more in number. In the illustrated embodiment, as the respective rolling elements 10, 10, there are used balls, however, in the case of a wheel-supporting hub unit for a car which is large in weight, taper rollers may also be used as the rolling elements.

Further, the hub 2 is formed in a cylindrical shape. In the inner peripheral surface of the hub 2, there is formed a female spline portion 11. On the female spline portion 11, there is disposed a constant-velocity joint 12. A drive shaft 13 includes a male spline portion formed in its outer peripheral surface and is inserted into the constant-velocity joint 12. A nut 14 is threadedly engaged with the leading end portion of the drive shaft 13. A stepped portion 15 is formed in the base end portion of the drive shaft 13. The inside end face of the nut 14 is contacted with the outside end face of the hub 2. The stepped surface 16 of the stepped portion 15 is contacted with the inside end face of the caulking portion 7 formed in the inside end portion of the hub 2. In this contact state, by fastening the nut 14, the hub 2 can be connected to the drive shaft 13. In the inside end face of the caulking portion 7, a flat portion 17 is formed to secure a contact area of the caulking portion 7 with respect to the stepped surface 16. The flat portion prevents the contact area from being deformed elastically and collapsing through plastic deformation.

In the outer peripheral surface of the outer ring 8, there is formed an outwardly-facing flange-shaped mounting portion 18. To assemble the above-structured wheel-supporting hub unit 1 to the car, the outer ring 8 is fixed to a suspension through the outwardly-facing flange-shaped mounting portion 18, and the wheels of the car is fixed to the flange 3. As a result of this, the wheels can be rotatably supported on the suspension. Alternatively, by driving the drive shaft 13 of the constant-velocity joint 12 rotationally through a rotation transmission shaft (not shown) with its base end portion connected to a differential gear (not shown), the hub 2 and the wheels fixed to the hub 2 can be driven or rotated.

When forming the caulking portion 7 in the inside end portion of the hub 2 so as to be shown the conventional structure in FIGS. 9A, 9B and 10, a cylindrical portion 19 formed in the inside end portion of the hub 2 is strongly pressed by a pressing mold. Then, the cylindrical portion 19 is plastic deformed outwardly in the diameter direction thereof. In this case, to the cylindrical portion 19, there are applied not only a force going outwardly in the diameter direction but also a large force going outwardly in the axial direction. Further, in the final stage of such working or plastic deforming operation, a force that goes inwardly in the diameter direction is also applied to the cylindrical portion 19. There is a possibility that, of these three kinds of forces, due to the two forces respectively going outwardly in the axial direction and going inwardly in the diameter direction, a part of the cylindrical portion 19 can be bulged and deformed inwardly in the diameter direction. In a case that the part of the cylindrical portion 19 is deformed inwardly in the diameter direction, there is a possibility that the drive shaft 13 of the constant-velocity joint 12 cannot be inserted into the female spline portion 11 formed in the central portion of the hub 2.

Further, there is another possibility that the fitted portion between the inner peripheral surface of the inner ring 6 and the outer peripheral surface of the cylindrical portion 19 can provide a clearance-fit in a part.

In a case that the fitted state provides such clearance-fit, a phenomenon called "creep", where the inner ring 6 rotates with respect to the hub 2, is easy to occur. In the case of the creep occurring, as the wheel-supporting hub unit 1 is used for a long period of time, unfavorably, the respective peripheral surfaces forming the above-mentioned fitted portion are worn. Further, a rickety motion is thereby easy to occur in the fitted portion. Especially, in a case that the axial length of the cylindrical portion 19 is large, there is a possibility that the inside diameter of a part of the cylindrical portion 19 can be reduced. The part of the cylindrical portion 19 is a considerable portion of the outer peripheral surface of the cylindrical portion 19, that is opposed to the inner peripheral surface of the inner ring 6. In such case, as the above-mentioned creep is easy to occur, it is necessary to prevent the diameter of the cylindrical portion 19 from reduce, with the working operation for forming the caulking portion 7.

The above-mentioned problem, that the drive shaft 13 cannot be inserted into the female spline portion 11, is a problem peculiar to a wheel-supporting hub unit for the drive wheels. However, the lowered support strength of the inner ring 6 caused by the occurrence of the clearance-fit can occur not only in a wheel-supporting hub unit for drive wheels but also in a wheel-supporting hub unit for coupled driving wheels (the front wheels of an FR car, and the rear wheels of an FF car).

SUMMARY OF THE INVENTION

The present invention aims at eliminating the above-mentioned drawbacks found in the conventional method for manufacturing a wheel-supporting hub unit and the conventional pressing mold for manufacturing such a hub unit. Accordingly, it is an object of the invention to provide a method for manufacturing a wheel-supporting hub unit and a pressing mold for manufacturing such a hub unit, which can prevent the diameter of a cylindrical portion formed in the inside end portion of a hub from being reduced in the working operation for forming a caulking portion.

In order to accomplish the object above, the following mean are adopted. According to the present invention, there is provided method for manufacturing wheel-supporting hub unit and pressing mold for manufacturing same hub unit. The method according to the first aspect of the invention, for example, similarly to the previously described conventional wheel-supporting hub unit shown in FIGS. 9A, 9B and 10, comprises a hub, a first inner raceway, a stepped portion, an inner ring, an outer ring, and a plurality of rolling elements.

Of these components, the hub includes a flange for supporting and fixing wheels in the outer peripheral surface of its outside end portion.

The first inner raceway is formed in the outer peripheral surface of the middle portion of the hub directly or through the inner ring disposed separately from the hub.

The stepped portion is formed in the inside end portion of the hub and has a smaller outside diameter dimension than that of the portion where the first inner raceway is formed.

The inner ring includes a second inner raceway formed in its outer peripheral surface and is fitted with the stepped portion.

The outer ring includes, in its inner peripheral surface, a first outer raceway opposed to the first inner raceway and a second outer raceway opposed to the second inner raceway, while the outer ring is not rotatable even when it is in use.

Further, the rolling elements are interposed between the first inner raceway and first outer raceway as well as between the second inner raceway and second outer raceway, respectively in two or more in number.

The inner ring fitted with the stepped portion is connected and fixed to said hub in such a manner that it is held toward a stepped surface of the stepped portion by a caulking portion. The caulking portion is formed by plastic deforming which caulks and spreads a cylindrical portion outwardly in the diameter direction of the hub. In this bout, the cylindrical portion is formed in the inside end portion of the hub in such a manner that the inside end portion of the cylindrical portion is projected inwardly from the inner ring fitted with the outer surface of the stepped portion.

According to the method for manufacturing the above-structured wheel-supporting hub unit, as a pressing mold for plastic deforming caulks and spreads a cylindrical portion outwardly in the diameter direction, there is used a pressing mold including a cylindrical projecting portion which can be freely pushed into the cylindrical portion. Therefore, a part of the cylindrical portion is superimposed on the inner peripheral surface of the inner ring in the diameter direction. In addition, the part is supported by the cylindrical projecting portion to prevent the cylindrical portion from shifting toward the inside diameter side. That is, the caulking portion is formed in this manner.

The pressing mold for manufacturing the wheel-supporting hub unit according to the second aspect of the invention is used when enforcing a wheel-supporting hub unit manufacturing method according to the first aspect of the invention. That is, the present pressing mold can be butted against the leading end face of the above-mentioned cylindrical portion to thereby apply to the cylindrical portion not only a force moving in the axial direction but also a force moving outwardly in the diameter direction. The pressing mold for manufacturing a wheel-supporting hub unit, according to the second aspect of the invention, includes a cylindrical projecting portion slidable into the inside of the cylindrical portion formed in the central portion of the leading end face thereof, and an annular-shaped recessed portion formed in the periphery of the cylindrical projecting portion so as to enclose the entire periphery of the cylindrical projecting portion. The outer peripheral surface of the cylindrical projecting portion can be contacted with the inner peripheral surface of the cylindrical portion in such a manner that the annular-shaped recessed portion is butted against the inside end portion of the cylindrical portion to thereby plastic deform the cylindrical portion.

Preferably, the operation to plastic deform (caulk and spread) the cylindrical portion outwardly in the diameter direction to form the caulking portion by the present manufacturing pressing mold may be carried out by oscillating and caulking the cylindrical portion. In this operation, more preferably, in a portion of the pressing mold, as the annular-shaped recessed portion forms the caulking portion, there may be used an annular-shaped recessed portion which has the following section shape. That is, said annular-shaped recessed portion further comprised a bottom surface portion disposed in the periphery of its deepest portion, an inside-diameter-side curved surface portion having a concave-arc-shaped section which continues smoothly with an outer peripheral part of said bottom surface portion or intersects said bottom surface portion at an outer part thereof, a conical-concave-shaped inclined surface portion having a linear-shaped section which continues smoothly with an outer peripheral part of said inside-diameter-side curved surface portion or intersects said inside-diameter-side curved surface portion at an outer part thereof and an outside-diameter-side projecting surface portion having a convex-arc-shaped section which continues smoothly with an outer peripheral part of said inclined surface portion or intersects said inclined surface portion at an outer part thereof. These three surface portions may be concentric with one another. Also, as assuming that there is a virtual straight line connecting the oscillation center of the pressing mold with the boundary position between the inside-diameter-side curved surface portion and the inclined surface portion, an angle formed between the inclined surface portion and a perpendicular line with respect to the virtual straight line is defined as a tangent angle. Further, an intersection angle between the present virtual straight line and a virtual plane portion extending at right angles to the oscillation center axis of the pressing mold is defined as an offset angle. Under these conditions, the tangent angle is regulated to the range from 13° to (an angle defined by subtracting said offset angle from 90°).

[Operation]

The operation to support wheels on a suspension rotatably, which is carried out by a wheel-supporting hub unit manufactured by the above-structured wheel-supporting hub unit manufacturing method according to the invention, is similar to the operation of the conventional wheel-supporting hub unit shown in FIGS. 9A, 9B and 10.

Especially, in the case of the wheel-supporting hub unit manufacturing method according to the invention, since the caulking portion is formed by an oscillating and caulking operation while holding the inner peripheral surface of the cylindrical portion by the outer peripheral surface of the cylindrical projecting portion, the cylindrical portion can be prevented from shifting in part inwardly in the diameter direction and the shape of the caulking portion can be regulated strictly as desired. Therefore, there is eliminated a fear that the support strength of the inner ring by the caulking portion can be short. And, in the case of a wheel-supporting hub unit for drive wheels, there is no possibility that the operation to insert the drive shaft into the inside diameter side of the hub can be troublesome. Also, the fitted portion between the outer peripheral surface of the cylindrical portion and the inner peripheral surface of the inner ring can be maintained in a close fit state, thereby being able to prevent the occurrence of a creep phenomenon in which the inner ring can rotate with respect to the cylindrical portion.

Especially, in case where the tangent angle of the inclined surface portion formed in the annular-shaped recessed portion of the pressing mold is regulated to the range from 13° to (an angle defined by subtracting said offset angle from 90°), not only the occurrence of burrs in the outer peripheral edge portion of the caulking portion but also the occurrence of cracks in the caulking portion can be prevented, which makes it possible to provide a caulking portion of better quality.

BRIEF DESCRIPTION OF THE DRAWINGS

FIGS. 9A and 9B are a half-section section view of a conventional structure; and, FIG. 10 is a partially enlarged section view of the conventional structure.

DETAILED DESCRIPTION OF THE PREFERRED EMBODIMENTS

Figure 1:
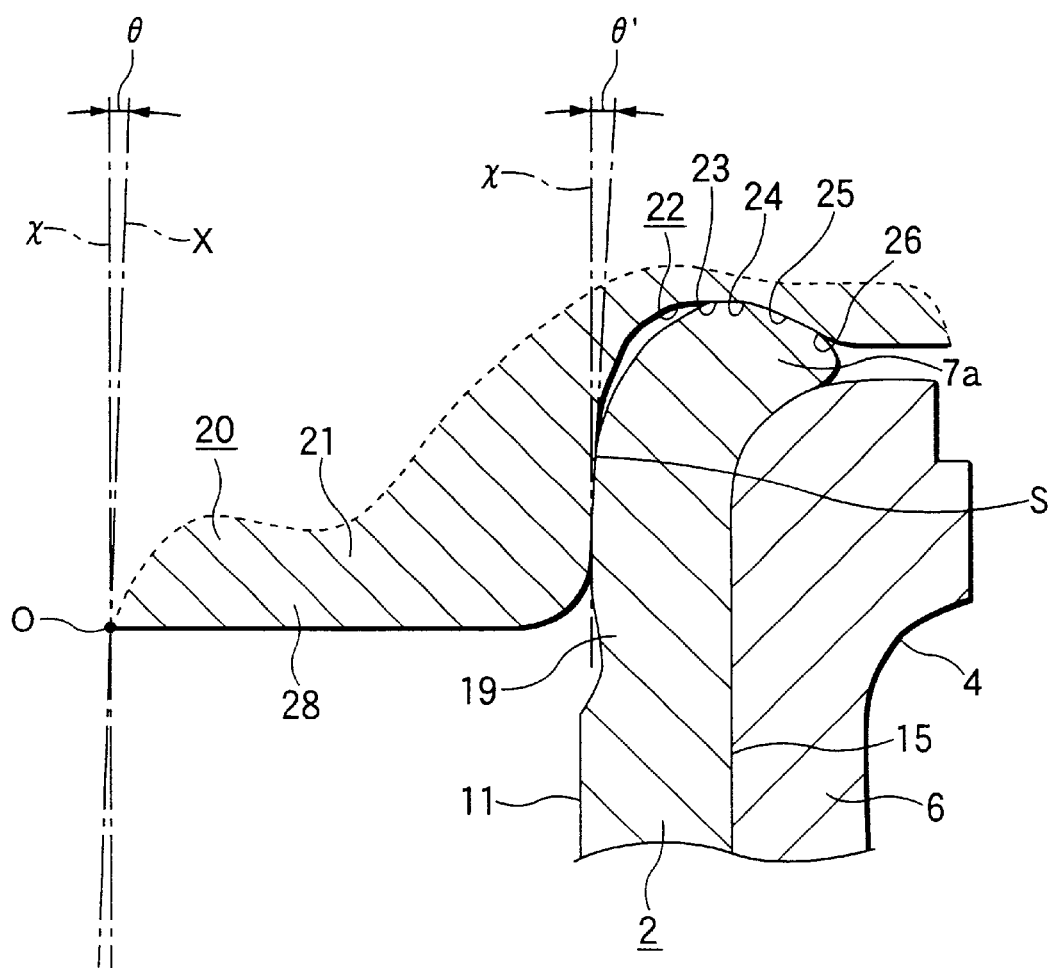
FIG. 1 is a partial section view of a pressing mold for manufacturing such hub unit used in a first embodiment of a method for manufacturing a wheel-supporting hub unit, showing the final-stage state of a working operation for forming a caulking portion.
Figure 2:
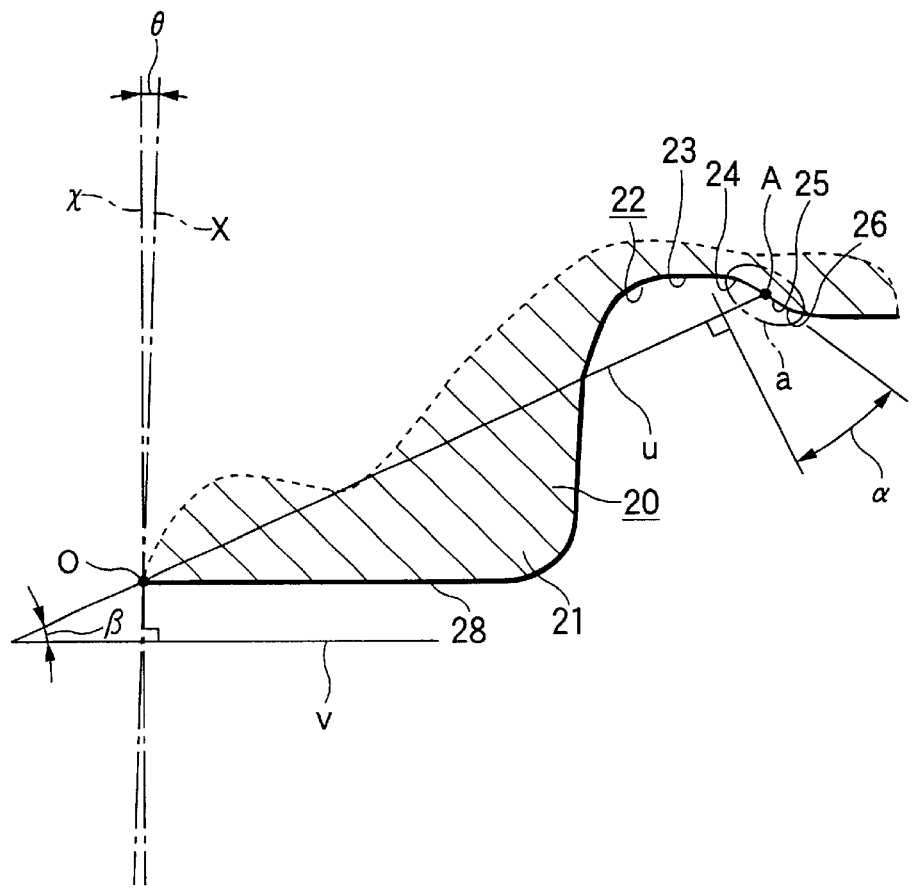
FIG. 2 is a partial section view of the first embodiment, showing mainly the pressing mold used therein.
Figure 3:
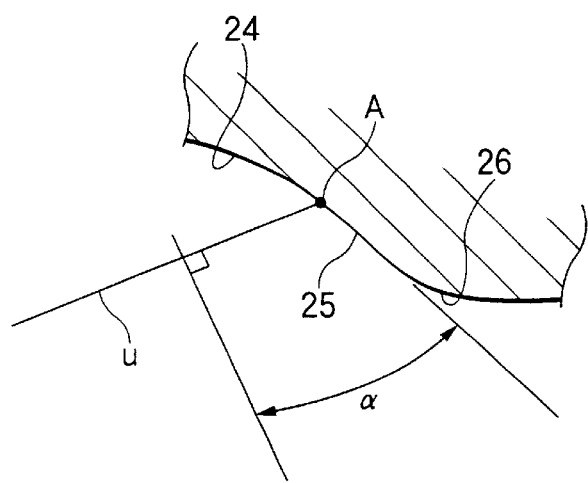
FIG. 3 is an enlarged view of the a portion shown in FIG. 2.
Figure 9B:
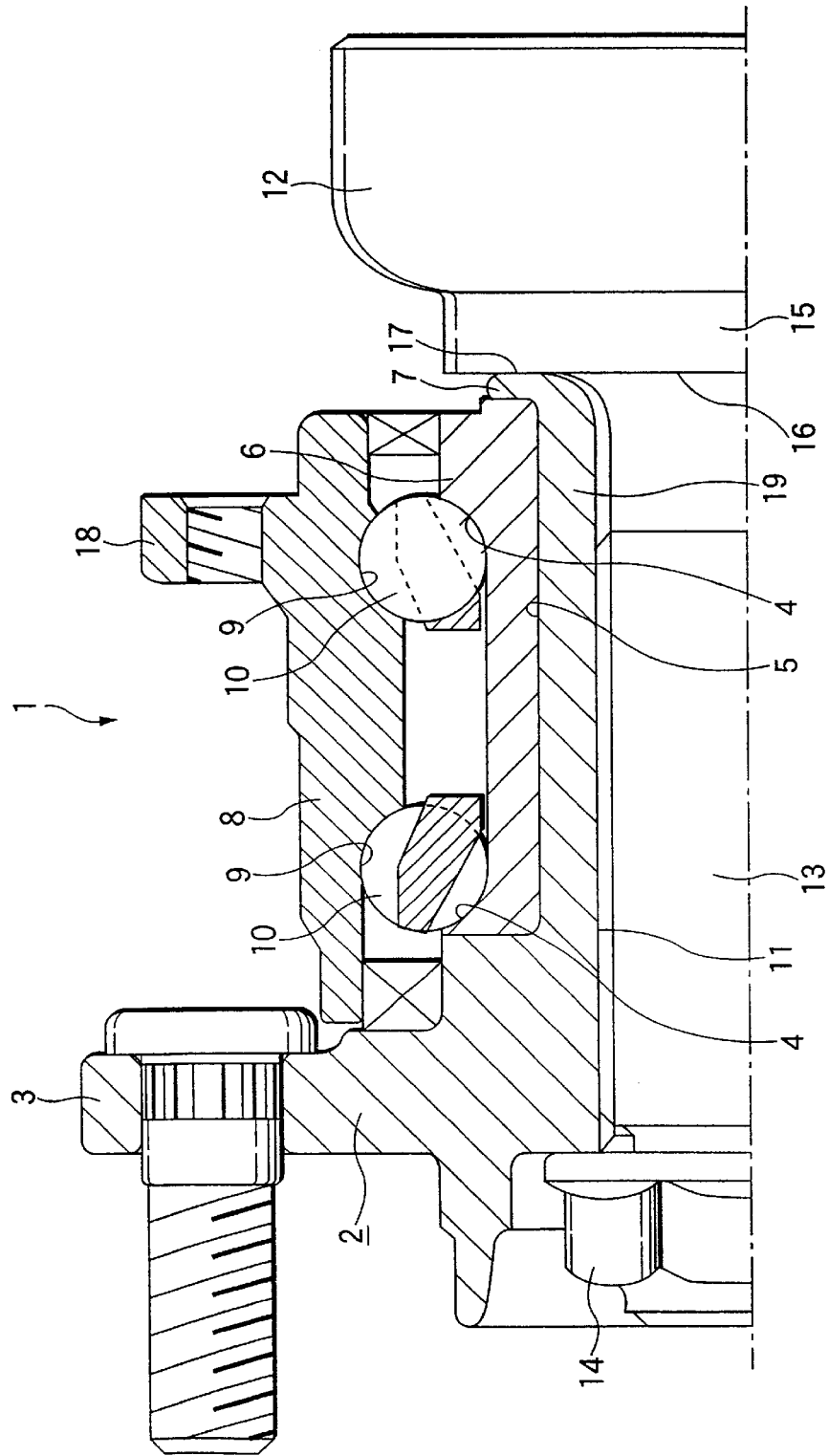
Figure 10:
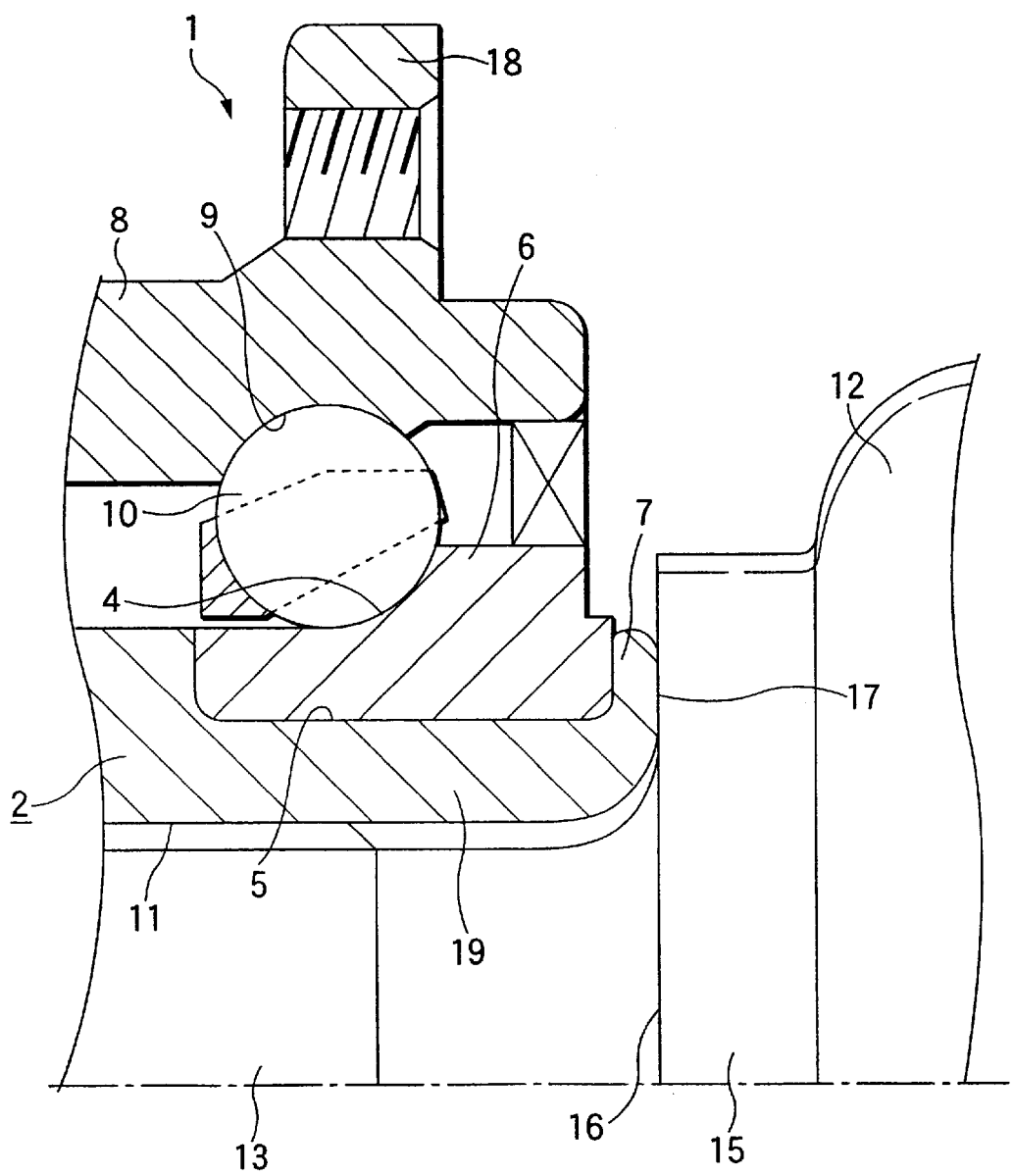

Now, FIGS. 1 to 3 show a first embodiment of a method for manufacturing a wheel-supporting hub unit according to the invention. The present invention is characterized not only by an improved method of stably forming a caulking portion 7a for holding an inner ring 6 with respect to a hub 2 but also by an improved pressing mold 20 to be used for enforcing the present method. The structures and operations of the other remaining portions of the invention are similar to the conventional wheel-supporting hub unit shown in FIGS. 9A, 9B and 10. Therefore, the duplicate illustration and description thereof are omitted or simplified and thus description will be given below mainly of the characteristic portions thereof.

In enforcing the method for manufacturing a wheel-supporting hub unit according to the invention, the inside end portion of a cylindrical portion 19 is formed in the inside end portion of the hub 2. The inside end portion projects from the inside end face of the inner ring 6 fitted with the outer surface of a stepped portion 15. The stepped portion 15 includes the outer peripheral surface of the cylindrical portion 19. Then, the inside end portion is caulked and spread by using the pressing mold 20 assembled to an oscillatory pressing apparatus (not shown), thereby forming the caulking portion 7a. The pressing mold 20 is structured such that, in the periphery of a cylindrical projecting portion 21 to be pushed into the cylindrical portion 19, there is formed an annular-shaped recessed portion 22 for forming the caulking portion 7a. The shapes and dimensions of the cylindrical projecting portion 21 and annular-shaped recessed portion 22 are regulated in the following manner.

Firstly, a linear portion S forms the outer peripheral surface of the cylindrical projecting portion 21 and has a linear-shaped section. The linear portion S is also formed in a cylindrical shape having an outside diameter constant in the axial direction thereof, or, in a taper shape tapering slightly toward its leading end (in FIGS. 1 to 3, the lower end) in a direction where its outside diameter decreases. Referring to the outside diameter dimension of the cylindrical projecting portion 21, it is regulated such that, while the pressing mold 20 is oscillatingly shifted. Then, the cylindrical portion 19 is plastic deformed to thereby form the caulking portion 7a. The cylindrical projecting portion 21 can be moved into the inside diameter side of the cylindrical portion 19 or the caulking portion 7a. In addition, The the cylindrical projecting portion 21 can be contacted with the portion of the inner peripheral surface of the cylindrical portion 19 or the caulking portion 7a, whose phase in the circumferential direction corresponds to (coincides with) the phase of the portion held by the annular-shaped recessed portion 22. In the illustrated embodiment, the inclination angle of the outer peripheral surface of the cylindrical projecting portion 21 with respect to the center axis X of the pressing mold 20 including the cylindrical projecting portion 21 is regulated that the pressing mold 20 is inclined by a set oscillation angle θ (for example, 2°). In the oscillating/caulking operation, the inclination angle θ' of the linear portion S with respect to the center axis x of the hub 2 provides a value equal to or slightly larger than the angle θ by which the pressing mold 20 is oscillated and shifted. Specifically, 2° (in case where the outside diameter of the linear portion S is constant) or slightly larger than 2° (in case where the linear portion S has a taper shape). Due to such regulations for the shape and dimension of the cylindrical projecting portion 21, when the inclination angle (oscillatory angle) θ of the pressing mold 20 after completion of the caulking operation is returned to zero degree and the pressing mold 20 is then removed from the hub 2, the cylindrical projecting portion 21 can be prevented from biting into and interfering with the deformed portion of the inner peripheral surface of the cylindrical portion 19 that has been deformed toward the inside diameter side due to the plastic deformation.

Next, as the above-mentioned annular-shaped recessed portion 22, there is used an annular-shaped recessed portion which has the following section shape.

The section of the deepest portion, namely, the bottom surface portion 23 of the annular-shaped recessed portion 22 is formed to have a smooth concave-arc shape in order that the inside end face (in FIG. 1, the upper end face) of the caulking portion 7a can have a desired shape. In the periphery of the bottom surface portion 23, there are formed an inside-diameter-side curved surface portion 24, an inclined surface portion 25 and an outside-diameter-side curved surface portion 26. They are respectively arranged from the inside diameter side to the outside diameter side and are concentric with one another. Of these three surface portions, the inside-diameter-side curved surface portion 24 is formed such that it smoothly continues with the outer peripheral part of the bottom surface portion 23 and has a concave-arc-shaped section shape. The inclined surface portion 25 is formed such that it smoothly continues with the outer peripheral part of the inside-diameter-side curved surface portion 24 and has a linear and conical-concave surface shape. Further, the outside-diameter-side curved surface portion 26 is formed such that it smoothly continues with the outer peripheral part of the inclined surface portion 25 and has a convex-arc-shaped section. In the above description, the continuous portions of the bottom surface portion 23, inside-diameter-side curved surface portion 24, inclined surface portion 25 and outside-diameter-side curved surface portion 26 are all formed to be smooth. However, these continuous portions may not be always smooth but they may continue in an intersecting manner (in an un-smoothed manner).

Also, let us assume a virtual straight line u connecting the oscillation center O of the pressing mold 20 with a boundary position A. The boundary position A is defined between the inside-diameter-side curved surface portion 24 and inclined surface portion 25. An angle α formed by the inclined surface portion 25 and a straight line perpendicular to the virtual straight line u is defined as a tangent angle. Further, an intersection angle β between the virtual straight line u and a virtual plane v perpendicular to the oscillation center axis x of the pressing mold 20 coincident with the center of the hub 2 is defined as an offset angle. Under these conditions, the tangent angle α is regulated to the range from 13° to (an angle defined by subtracting said offset angle β from 90°).

To caulk and spread the inside end portion of the cylindrical portion 19 formed in the inside end portion of the hub 2, the pressing mold 20 is used for forming the caulking portion 7a. The pressing mold 20 includes the above-formed cylindrical projecting portion 21 and annular-shaped recessed portion 22. At this time, the hub 2 may be supported on the support base of an oscillating/caulking apparatus. The pressing mold 20 may be supported on the ram of the oscillating/caulking apparatus. And, the pressing mold 20 may be pressed against the cylindrical portion 19 while it is being oscillated and shifted about the oscillation center axis x. As a result of such pressing operation, the cylindrical portion 19 is plastic deformed to thereby provide the caulking portion 7a.

In the above-mentioned caulking operation, the cylindrical portion 19 is plastic deformed due to the pressing of the pressing mold 20 against the cylindrical portion 19. Then, the inside-diameter-side curved surface portion 24 and inclined surface portion 25 respectively is formed by the annular-shaped recessed portion 22 of the pressing mold 20. the inside-diameter-side curved surface portion 24 and inclined surface portion 25 respectively are butted against the cylindrical portion 19 to thereby work the leading end portion of the cylindrical portion 19 into the caulking portion 7a. And, in case where the caulking portion 7a is further deformed plastically by the pressing mold 20, a force moving inwardly in the diameter direction is applied to the caulking portion 7a from the inside-diameter-side curved surface portion 24 and inclined surface portion 25. Therefore, the cylindrical portion 19 is going to shift (bulge out) toward the inside diameter side. In this case, without the cylindrical projecting portion 21 of the pressing mold 20, the shifting of the cylindrical portion 19 toward the inside diameter side cannot be prevented. Therefore, not only the close contact between the outer peripheral surface of the stepped portion 15 and the inner peripheral surface of the inner ring 6 can be degraded, but also the inside diameter of the cylindrical portion 19 can be reduced excessively. On the other hand, in the case of the invention, since the cylindrical projecting portion 21 is formed in the pressing mold 20, the cylindrical portion 19 can be prevented from shifting toward the inside diameter side. The close contact between the outer peripheral surface of the stepped portion 15 and the inner peripheral surface of the inner ring 6 can not only enhance, but also can prevent the inside diameter of the cylindrical portion 19 from being reduced excessively.

As described above, in the case of a method for manufacturing a wheel-supporting hub unit according to the present invention, the oscillating/caulking operation is executed while the inner peripheral surface of the cylindrical portion 19 is being held by the outer peripheral surface of the cylindrical projecting portion 21. Therefore, the inner peripheral surface of the cylindrical portion 19 or the caulking portion 7a can be prevented from bulging out inwardly in the diameter direction. As a result of this, the shapes and dimensions of the formed caulking portion 7a and cylindrical portion 19 can be regulated strictly as desired. Therefore, it is eliminated not only a fear that the support strength of the inner ring 6 can be short by the caulking portion 7a, but also a fear that the operation to insert the drive shaft 13 (FIGS. 9A, 9B and 10) into the female spline portion 11 formed in the central portion of the hub 2 can be troublesome. Also, the fitted portion between the outer peripheral surface of the cylindrical portion 19 and the inner peripheral surface of the inner ring 6 can be maintained in a close fit state. Therefore, it is able to prevent the occurrence of a creep phenomenon in which the inner ring 6 can rotate with respect to the cylindrical portion 19.

Further, in the illustrated embodiment, the tangent angle α of the inclined surface 25 formed in the annular-shaped recessed portion 22 of the pressing mold 20 is regulated to the range from 13° to (an angle defined by subtracting said offset angle β from 90°) (for example 20.9°). Therefore, not only the occurrence of burrs in the outer peripheral edge portion of the caulking portion 7a but also the occurrence of cracks in the caulking portion 7a can be prevented. In addition, it is being able to provide a caulking portion 7a of better quality. In the illustrated case, the oscillation center O is situated in the central portion of the leading end face of the cylindrical projecting portion 21 and the offset angle β is set at an angle of 25°. The position of the oscillation center O can be set arbitrarily, provided that it is present on the center axis of the pressing mold 20 or on the extension thereof. In the present embodiment, from the viewpoint of prevention of interference between the components of the oscillating/caulking apparatus as well as from the viewpoint of prevention of interference between the cylindrical projecting portion 21 and cylindrical portion 19. The oscillation center O is set at the above position.

The inventors have confirmed experimentally that, in the case where the tangent angle α is set at an angle of 13° or more, burrs can be prevented from occurring in the outer peripheral edge portion of the caulking portion 7a. That is, the tangent angle α was varied in seven ways, namely, 3°, 5°, 10°, 11°, 13°, 20° and 27°. In these seven angles, the caulking portion 7a was visually observed for the thus obtained characteristics thereof. As a result of this, in the case of the four cases having the tangent angle α of 3°, 5°, 10°, 11°, thread-like burrs occurred in the outer peripheral edge portion of the formed caulking portion 7a. On the other hand, in the case of the remaining three cases having the tangent angle α of 13°, 20° and 27°, the occurrence of burrs could not be observed in the outer peripheral edge portion of the formed caulking portion 7a.

By the way, in case where the tangent angle α is set at an excessively large angle, an angle formed between the inclined surface portion 25 and the center axis of the pressing mold 20 increases. In this case, it makes difficult to increase an average compressive stress to be applied to the cylindrical portion 19 or the caulking portion 7a, so that cracks are easy to occur. To confirm this, the inventors observed the characteristics of the formed caulking portion 7a while varying the value of the tangent angle α with the offset angle β set in the range from 13° to 29°. Our observation has found that, for the offset angle β of 24°, in case where the tangent angle α exceeds 66°, no burrs occurred in the caulking portion 7a but cracks occurred in the caulking portion 7a. On the other hand, in case where the tangent angle α is less than 66°, neither burrs nor cracks occurred in the caulking portion 7a. With these observation results taken into account, the tangent angle α may be regulated to the range from 13° to (an angle defined by subtracting said offset angle β from 90°), more preferably, to the range from 20° to 30°.

Figure 4:
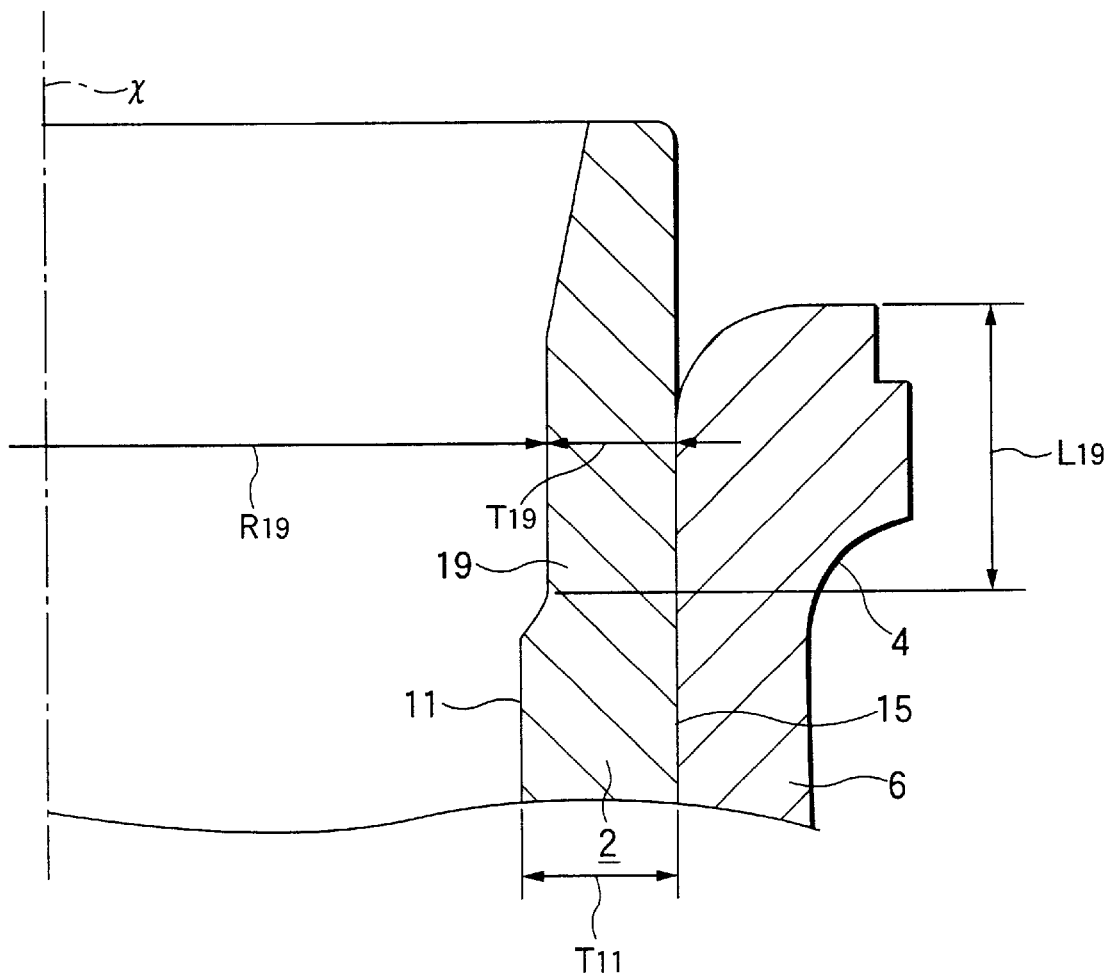
FIG. 4 is a partial section view of the first embodiment, explaining the specific dimensions of the inside end portion of a hub.
Figure 5:
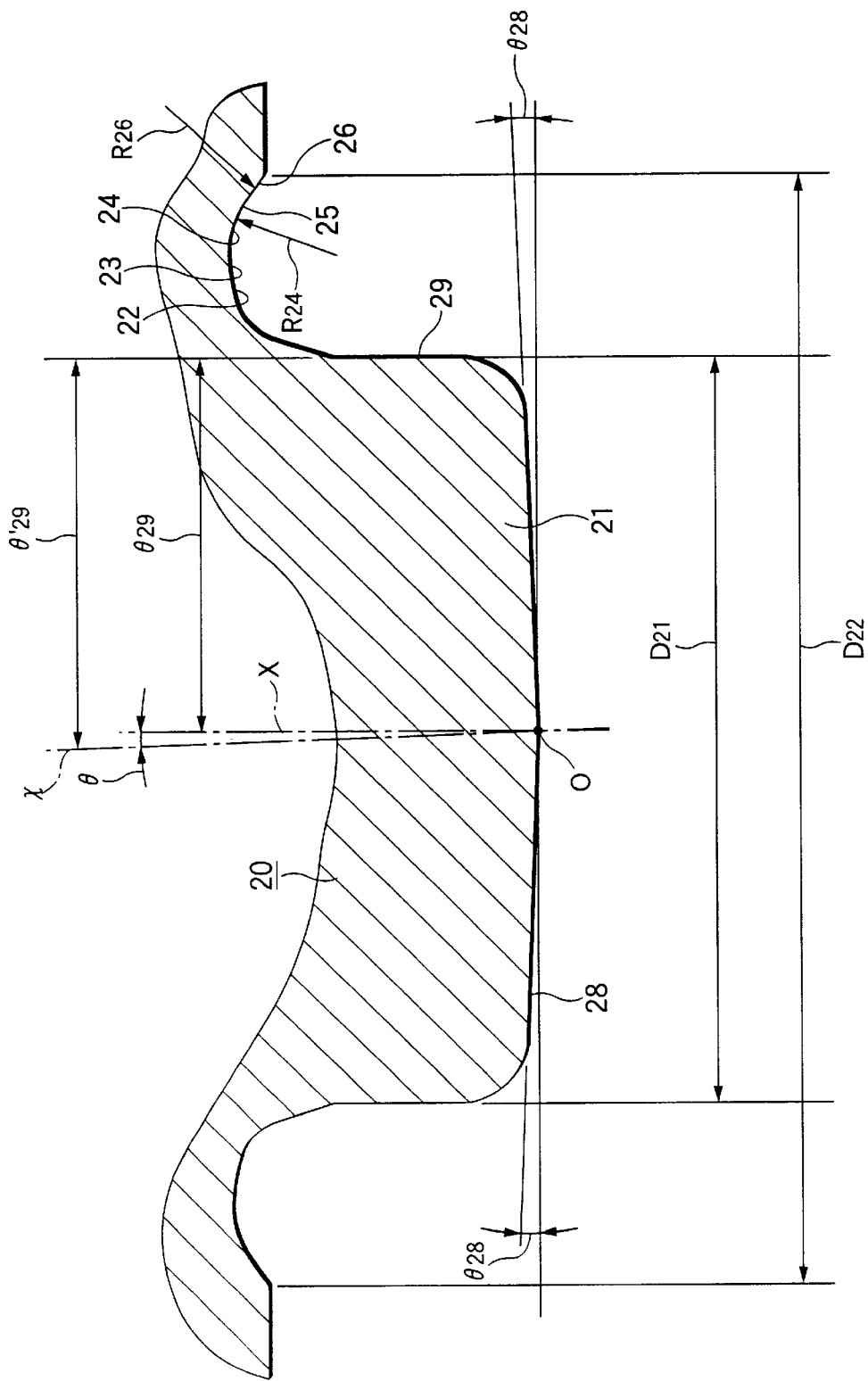
FIG. 5 is a partial section view of the first embodiment, explaining the specific dimensions of the pressing mold.

Now, FIGS. 4 and 5 show an example of a dimension range when the invention is applied to a wheel-supporting hub unit for the drive wheels of an ordinary car. Firstly, description will be given below of the dimensions of hub 2 side with reference to FIG. 4. Of the hub 2, a portion forming a female spline portion 11 has a thickness $T_{11}$ of 5–8 mm, the base half section of the cylindrical portion 19 has a thickness $T_{19}$ of 3–6 mm, the inside diameter (the diameter of the inner peripheral surface) of this base half section is 25.2–41.8 mm, and an axial distance $L_{19}$ from the base end edge of the cylindrical portion 19 to the inside end face of the inner ring 6 is set approximately in the range of 3–15 mm. The outer peripheral surface of the cylindrical projecting portion 21 of a pressing mold 20 (which will be discussed later) is contacted with the inner peripheral surface of the cylindrical portion 19 in any portion, which is present in the axial distance $L_{19}$. Therefore, it is prevented the cylindrical portion 19 from shifting toward the inside diameter side.

Next, description will be given below of the dimensions of the pressing mold 20 side for caulking the cylindrical portion 19 formed in the inside end portion of the hub 2 with reference to FIG. 5. The following numeric values relate to a case where an angle (oscillation angle) θ formed between the center axis X and oscillation center axis x of the pressing mold 20 is set at 2°. The leading end face of the cylindrical projecting portion 21 formed in the leading end face central portion of the pressing mold 20 is formed as a slightly inclined conically-convex surface. An intersection angle $θ_{28}$ between the bus of the leading end face 28 and a virtual plane intersecting with the center axis X of the pressing mold 20 at right angles is set at 2°. Also, an intersection angle $θ_{29}$ between the outer peripheral surface 29 of the cylindrical projecting portion 21 and the center axis X of the pressing mold 20 is set in the range of 0–2°. Therefore, an intersection angle $θ_{29}'$ between this outer peripheral surface 29 and the above-mentioned oscillation center axis x is, in the largest portion thereof, in the range of 2–4° Also, the outside diameter $D_{21}$ of the cylindrical projecting portion 21 is set in the range of 25–40 mm, the outside diameter $D_{22}$ of an annular-shaped recessed portion 22 existing in the periphery of the cylindrical projecting portion 21 is set in the range of 40–60 mm, the curvature of radius $R_{24}$ of the section shape of an inside diameter side curved surface portion 24 formed in the annular-shaped recessed portion 22 is set in the range of 2–8 mm, and the curvature of radius $R_{26}$ of the section shape of an inside diameter side curved surface portion 26 formed in the annular-shaped recessed portion 22 is set in the range of 0.5–5 mm.

In case where the cylindrical projecting portion 21 of the pressing mold 20 is formed in such a shape as shown in FIG. 5 and has the above-mentioned dimensions. The cylindrical projecting portion 21 is inserted into the cylindrical portion 19 of the hub 2 formed in such a shape as shown in FIG. 4 and having the above-mentioned dimensions. Therefore, the cylindrical portion 19 is plastically deformed in the early stage of the deforming operation. In addition, there exists a slight clearance between the inner peripheral surface of the cylindrical portion 19 and the outer peripheral surface of the cylindrical projecting portion 21. However, this clearance disappears as the plastically working operation for deforming the inside end portion of the cylindrical portion 19 into the caulking portion 7a progresses and, after disappearance of the clearance, the cylindrical projecting portion 21 prevents the cylindrical portion 19 from shifting further inwardly in the diameter direction.

Figure 6:
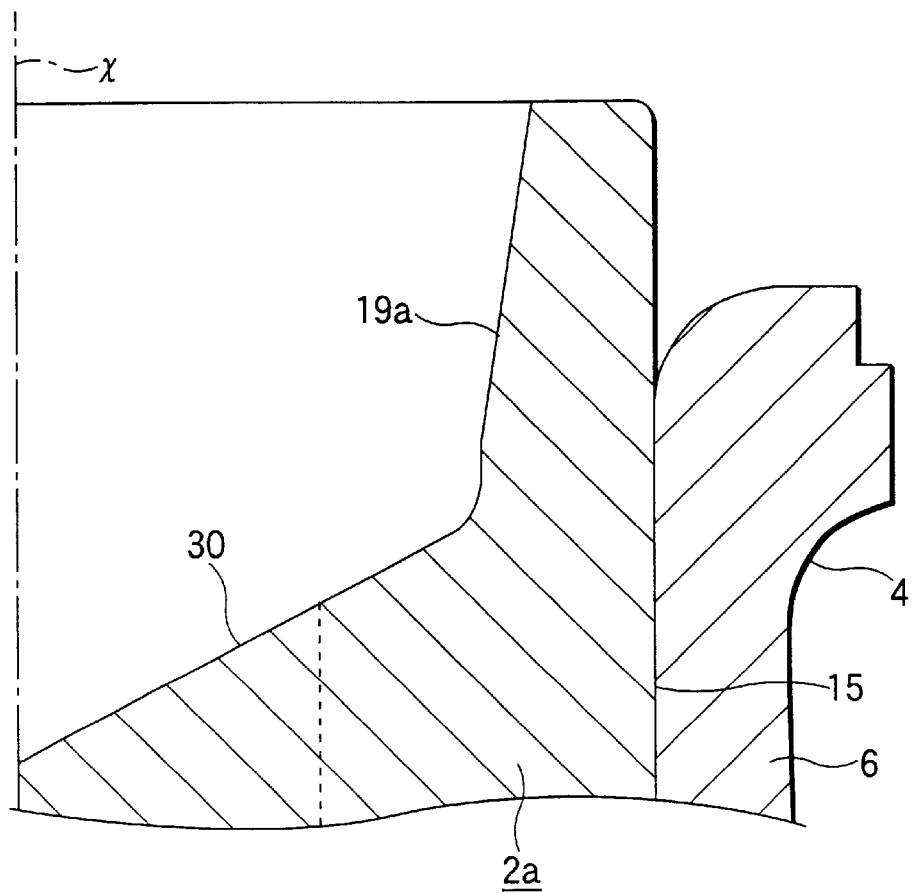
FIG. 6 is a partial section view of a second embodiment according to the invention, showing the inside end portion of a hub used therein.

The above-mentioned shapes of the pressing mold 20 including the cylindrical projecting portion 21 and annular-shaped recessed portion 22 are not always be limited to the manufacture of the hub unit for drive wheels but can be used in other uses. The shapes can also be applied to a hub unit for coupled driving wheels, provided that it includes in the inside end portion a recessed portion having a depth allowing the cylindrical projecting portion 21 to move freely into the recessed portion. Now, FIG. 6 shows an example of a hub 2a for forming such hub unit for coupled driving wheels, which belongs to a second embodiment of the invention. In the case of the hub 2a, a circular-shaped recessed hole 30 is formed in the central portion of the inside end face (in FIG. 6, the upper end face) of the hub 2a. Whereby, in the inside end portion of the hub 2a, there is formed a cylindrical portion for forming a caulking portion. In the coupled driving wheels, the diameter of a cylindrical portion 19a in the inside end portion of the hub 2a is, in most cases, slightly smaller than that of the cylindrical portion 19 (FIGS. 1, 4) formed in the inside end portion of the hub 2 constituting the previously-described hub unit for drive wheels. Therefore, the diameter of a pressing mold for caulking the inside end portion of the cylindrical portion 19a is also reduced down accordingly.

The inside end portion of the hub 2a is a solid body and forms the hub unit for coupled driving wheels. The axial dimension of the cylindrical portion 19a is formed in the inside end portion of the hub 2a. The axial dimension of the cylindrical portion 19a is shorter than the axial dimension of the cylindrical portion 19 (FIG. 4) formed in the inside end portion of the hub 2 which is hollow and forms the hub unit for drive wheels. In the case of the cylindrical portion 19a having a short axial dimension, the range where the outside diameter thereof is reduced due to the deforming operation for forming the caulking portion is limited. Therefore, when compared with the hub unit for drive wheels, a creep phenomenon is not easy to occur. In case where the invention is applied to the hub unit for coupled driving wheels, there can also be obtained an effect to a certain extent. Further, of the hubs forming hub units for coupled driving wheels, there is available a hub which is formed of a hollow cylindrical-shaped body for the purpose of reduction in the weight thereof. In the case of such hub, it seems that, similarly to the hub for drive wheels, the axial dimension of the cylindrical portion thereof is long. In this case, even in the hub for coupled driving wheels, application of the invention can provide a great effect.

Figure 7:
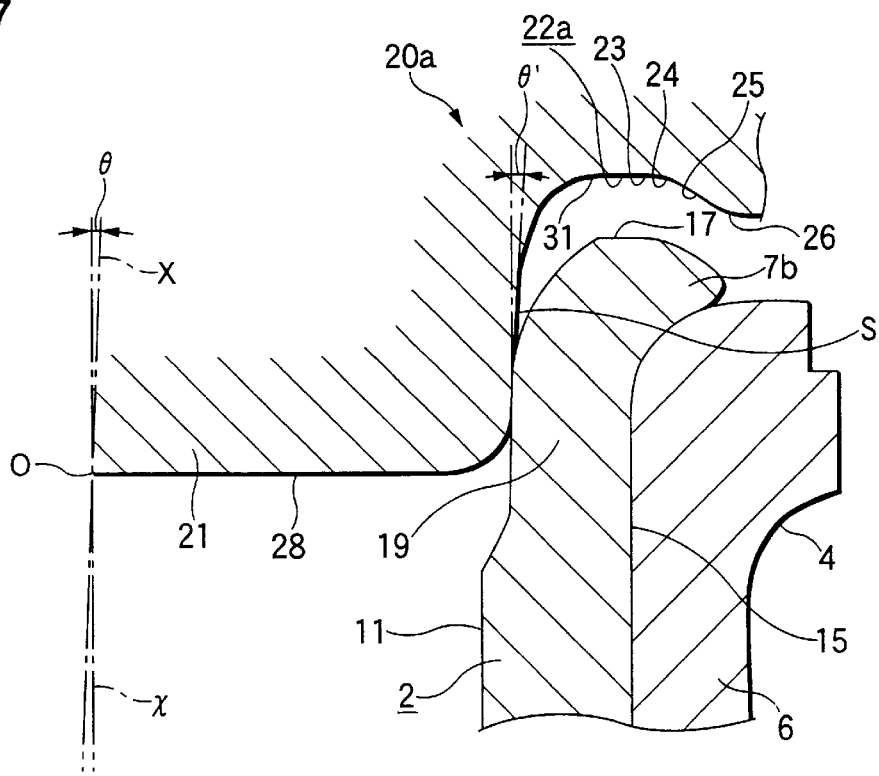
FIG. 7 is a partial section view of a third embodiment according to the invention, showing a state thereof in which, after a caulking portion is formed, the pressing mold is removed from the caulking portion.
Figure 8:
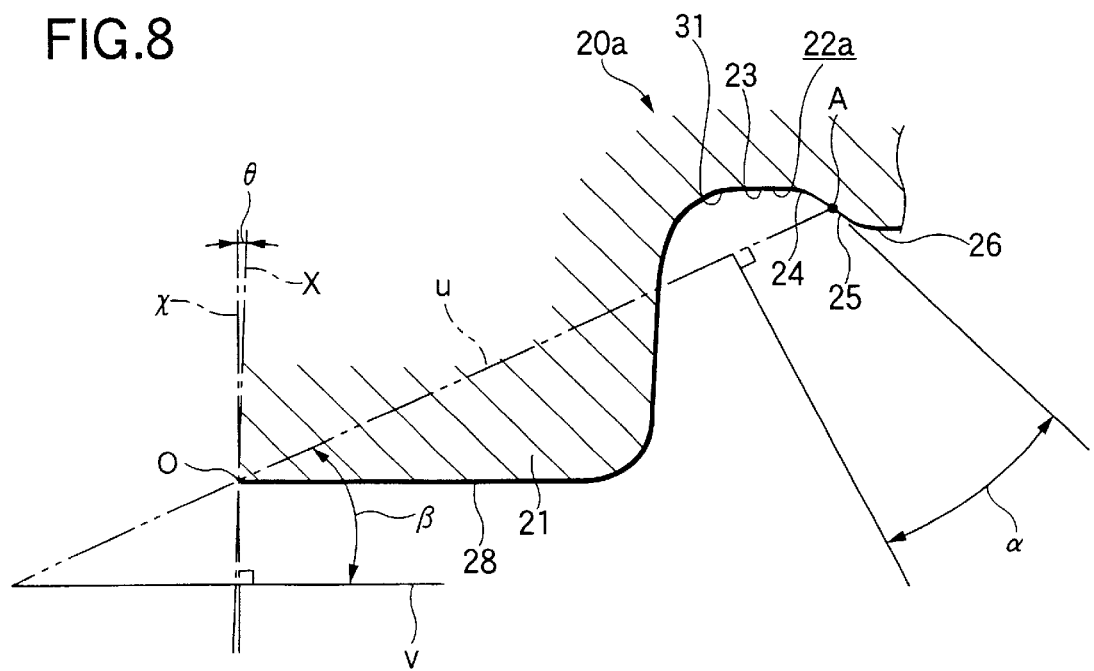
FIG. 8 is a partial section view of the third embodiment, showing mainly the pressing mold used therein.

Next, FIGS. 7 and 8 respectively show a third embodiment of a method for manufacturing a wheel-supporting hub unit according to the present invention. In the present embodiment, the inside end portion of the cylindrical portion 19 is oscillated and caulked using a pressing mold 20a. The inside end portion of the cylindrical portion 19 is thus plastic deformed to thereby form a caulking portion 7b. At the same time, in the inside end face of the caulking portion 7b, there is formed a flat portion 17. Thus, in the present embodiment, the bottom surface portion 23 of an annular-shaped recessed portion 22a is formed in the leading end face of the pressing mold 20a that encloses the cylindrical projecting portion 21. The bottom surface portion 23 is formed as a plane portion 31 having a linear section shape. In order to form the flat portion 17 in the inside end face (in FIG. 7, the upper end face) of the caulking portion 7b, in a state where the pressing mold 20a is in contact with the hub 2 while it is oscillating at a set oscillation angle θ as shown in FIG. 7, this plane portion 31 is formed so as to extend in a direction perpendicular to the center axis x of the hub 2.

The area of the plane portion 31 (the width dimension of the plane portion 31 in the diameter direction thereof) is set equal or larger than the area of the flat portion 17. The plane portion 31 is slightly inclined to the oscillation/shift angle in such a manner that the pressing portion thereof forms right angles with respect to the center axis x of the hub 2. Therefore, to speak strictly, the plane portion 31 is a small conical-shaped convex surface. In the present specification, such portion is also referred to as a plane portion. And, in the periphery of such plane portion 31, similarly to the previously described first embodiment, there are formed an inside-diameter-side curved surface portion 24, an inclined surface portion 25 and an outside-diameter-side curved surface portion 26. They are respectively arranged in order from the inside diameter side to the outside diameter side and are concentric with one another.

In the present embodiment, as described above, due to use of the pressing mold 20a including the plane portion 31 as the bottom surface portion 23 of the annular-shaped recessed portions 22a. At the same time when the caulking portion 7b is formed, the shape of the plane portion 31 is transferred to the inside end portion of the caulking portion 7b, so that the flat portion 17 is formed in the inside end face of the caulking portion 7b. In this manner, in the case of the present embodiment, the flat portion 17 is formed in the caulking portion 7b simultaneously when the cylindrical portion 19 is caulked and spread to thereby form the caulking portion 7b. Therefore, the operation to work the caulking portion 7b including the flat portion 17 is easy, which makes it possible to reduce the manufacturing cost of the present hub unit. The structures and operations of the remaining portions of the present embodiment are similar to those of the previously described first embodiment and, therefore, equivalent parts are given the same designations and thus the duplicate description thereof is omitted here.

According to the invention, since a method for manufacturing a wheel-supporting hub unit and a pressing mold for manufacturing such hub unit are structured and operate in the above-mentioned manner, there can be provided a wheel-supporting hub unit which not only can fix an inner ring to a hub positively but also, even in case where it is used for a long period of time, can prevent the occurrence of not only a creep phenomenon but also a rickety motion caused by such creep phenomenon.

The present disclosure relates to the subject matter contained in Japanese patent application No. 2000-362803 filed on Nov. 29, 2000 and Japanese patent application No. 2001-268323 filed on Sep. 5, 2001 which are expressly incorporated herein by reference in its entirety. While only certain embodiments of the invention have been specifically described herein, it will apparent that numerous modifications may be made thereto without departing from the spirit and scope of the invention.

What is claimed is:

1. A method for manufacturing a wheel-supporting hub unit, said hub unit comprising:

a hub including a flange for supporting and fixing a wheel on an outer peripheral surface in an outside end portion, a stepped portion formed on said outer peripheral surface in an inside end portion thereof, and a cylindrical portion formed in said inside end portion;

an inner ring fitted with an outer surface of said stepped portion and including at least one of a first inner raceway and a second inner raceway formed on an outer peripheral surface thereof;

an unrotatable outer ring including a first outer raceway opposed to said first inner raceway and a second outer raceway opposed to said second inner raceway respectively formed on an inner peripheral surface thereof;

a first group of rolling elements interposed between said first inner raceway and said first outer raceway; and a second group of rolling elements interposed between said second inner raceway and said second outer raceway, said method comprising steps of:

preparing a pressing mold including a cylindrical projecting portion movable into said cylindrical portion of said hub, and including an annular-shaped recessed portion formed in a periphery of said cylindrical projecting portion to enclose an entire periphery of said cylindrical projecting portion, wherein said annular-shaped recess portion comprises an inclined surface portion that is set at a tangent angle α, such that $$13° \leq \alpha \leq (90° - \text{an offset angle});$$

inserting said inner ring onto said outer peripheral surface of said cylindrical portion in such a manner that the inside end portion of said cylindrical portion is projected inwardly from an inside end portion of said inner ring;

pressing said pressing mold against said cylindrical portion in such a condition that said cylindrical projecting portion supports an inner peripheral surface of said cylindrical portion, where said inner ring is superimposed on said cylindrical portion in a diameter direction of said hub, so that said cylindrical portion is prevented from shifting toward an inside diameter side; and forming a caulking portion by plastic deforming said cylindrical portion outwardly in said diameter direction of said hub by using said pressing mold so that said inner ring is fixed to said hub in such a manner that said inner ring is held toward a stepped surface of said stepped portion by said caulking portion, wherein an outer peripheral surface of said cylindrical projecting portion is contacted with said inner peripheral surface of said cylindrical portion in such a manner that said annular-shaped recessed portion is butted against an end portion of said cylindrical portion to thereby plastic deform said cylindrical portion.

2. The method for manufacturing a wheel-supporting hub unit as set forth in claim 1, wherein:

said annular-shaped recess portion further comprises an inside-diameter-side curved surface portion adjacent to said inclined surface portion;

said offset angle is defined as the angle between a virtual plane perpendicular to a central axis of said pressing mold and a virtual line that extends between a first point and a second point;

said first point is an oscillation center of the pressing mold; and said second point is a boundary position between the inclined surface portion and the inside-diameter-side curved surface portion.

3. The method for manufacturing a wheel-supporting hub unit as set forth in claim 2, wherein:

said annular-shaped recess portion further comprises an outside-diameter-side curved surface portion disposed such that said inclined surface portion is between said inside-diameter-side curved surface portion and said outside-diameter-side curved surface portion.

4. A pressing mold for manufacturing a wheel-supporting hub unit, said hub unit comprising:

a hub including a flange for supporting and fixing a wheel on an outer peripheral surface in an outside end portion, a stepped portion formed on said outer peripheral surface in an inside end portion thereof, and a cylindrical portion formed in said inside end portion;

an inner ring fitted with an outer surface of said stepped portion and including at least one of a first inner raceway and a second inner raceway formed on an outer peripheral surface thereof;

an unrotatable outer ring including a first outer raceway opposed to said first inner raceway and a second outer raceway opposed to said second inner raceway respectively formed on an inner peripheral surface thereof;

a first group of rolling elements interposed between said first inner raceway and said first outer raceway;

a second group of rolling elements interposed between said second inner raceway and said second outer raceway; and a caulking portion fixing said inner ring to said hub in such a manner that said inner ring is held toward a stepped surface of said stepped portion, wherein;

when said inner ring is inserted onto said outer peripheral surface of said cylindrical portion, and an inside end portion of said cylindrical portion is projected inwardly from an inside end portion of said inner ring, said caulking portion is formed by pressing said pressing mold against a leading end face of said cylindrical portion for applying to said cylindrical portion a force moving in an axial direction and a force moving outwardly in a diameter direction and plastic deforming said cylindrical portion outwardly in said diameter direction of said hub by using said pressing mold;

said pressing mold comprising:

a cylindrical projecting portion formed in a central portion of said pressing mold and slidable into an inside of a center of said leading end face of said cylindrical portion to support an inner peripheral surface of said cylindrical portion, where said inner ring is superimposed on said cylindrical portion in said diameter direction of said hub, thereby said cylindrical portion is prevented from shifting toward an inside diameter side; and an annular-shaped recessed portion formed in a periphery of said cylindrical projecting portion to enclose an entire periphery of said cylindrical projecting portion, wherein said annular-shaped recess portion comprises an inclined surface portion that is set at a tangent angle θ, such that $$13° \leq \alpha \leq 90° - \text{an offset angle}),$$

wherein an outer peripheral surface of said cylindrical projecting portion is contacted with said inner peripheral surface of said cylindrical portion in such a manner that said annular-shaped recessed portion is butted against an end portion of said cylindrical portion to thereby plastic deform said cylindrical portion.

5. The pressing mold as set forth in claim 4, wherein:

said annular-shaped recess portion further comprises an inside-diameter-side curved surface portion adjacent to said inclined surface portion;

said offset angle is defined as the angle between a virtual plane perpendicular to a central axis of said pressing mold and a virtual line that extends between a first point and a second point;

said first point is an oscillation center of the pressing mold; and said second point is a boundary position between the inclined surface portion and the inside-diameter-side curved surface portion.

6. The pressing mold as set forth in claim 5, wherein:

said annular-shaped recess portion further comprises an outside-diameter-side curved surface portion disposed such that said inclined surface portion is between said inside-diameter-side curved surface portion and said outside-diameter-side curved surface portion.

* * * * *